(12) United States Patent
Boussemart et al.

(10) Patent No.: US 8,528,468 B2
(45) Date of Patent: Sep. 10, 2013

(54) METHOD OF PREPARING FOAM FROM A MILK-BASED ALIMENTARY LIQUID AND METHOD FOR IMPLEMENTING THE SAME

(75) Inventors: Christophe Boussemart, Lugrin (FR); Alfred Yoakim, St. Legier (CH)

(73) Assignee: Nestec S.A., Vevey (CH)

( * ) Notice: Subject to any disclaimer, the term of this patent is extended or adjusted under 35 U.S.C. 154(b) by 140 days.

(21) Appl. No.: 13/093,310

(22) Filed: Apr. 25, 2011

(65) Prior Publication Data

US 2011/0203462 A1 Aug. 25, 2011

Related U.S. Application Data

(62) Division of application No. 10/598,669, filed as application No. PCT/EP2005/002378 on Mar. 7, 2005.

(30) Foreign Application Priority Data

Mar. 10, 2004 (EP) .................................... 04005729

(51) Int. Cl.
*A47J 43/046* (2006.01)
*B01F 3/04* (2006.01)

(52) U.S. Cl.
USPC ............ 99/323.1; 99/348; 366/146; 366/206; 366/282; 366/601

(58) Field of Classification Search
USPC ..................... 99/348, 323.1, 323.3; 366/146, 366/206, 281, 282, 601
See application file for complete search history.

(56) References Cited

U.S. PATENT DOCUMENTS

| 3,220,450 | A | | 11/1965 | Aronson, II et al. |
| 3,752,057 | A | | 8/1973 | Groen, Jr. |
| 4,143,175 | A | | 3/1979 | Whelan et al. |
| 4,432,650 | A | * | 2/1984 | Langen et al. ................ 366/147 |
| 4,537,332 | A | | 8/1985 | Brown et al. |
| 5,374,444 | A | | 12/1994 | Langner |
| 5,498,757 | A | | 3/1996 | Johnson et al. |
| 5,505,982 | A | | 4/1996 | Krawczyk et al. |
| 5,611,265 | A | * | 3/1997 | Ronci et al. ..................... 99/353 |
| 5,614,243 | A | | 3/1997 | Dunn et al. |
| 5,925,394 | A | | 7/1999 | Levinson |
| 5,980,099 | A | * | 11/1999 | Soon ............................. 366/204 |

(Continued)

FOREIGN PATENT DOCUMENTS

| DE | 1022344 | 1/1958 |
| DE | 3314551 | 11/1984 |

(Continued)

OTHER PUBLICATIONS

Viennese NPL, 2000.

(Continued)

*Primary Examiner* — Reginald L Alexander
(74) *Attorney, Agent, or Firm* — K&L Gates LLP

(57) ABSTRACT

The invention concerns a method for preparing foam from a milk-based alimentary liquid, including the successive steps of: a) spacing a quantity of alimentary liquid in a container associated with stirring members; b) heating said quantity of alimentary liquid to bring it in proximity to a first desired temperature level while mechanically stirring it at a first stirring speed, lower than the foam creating speed, and c) stirring said quantity of liquid at a second stirring speed, sufficient to make said liquid foam.

14 Claims, 3 Drawing Sheets

(56) References Cited

U.S. PATENT DOCUMENTS

| | | | |
|---|---|---|---|
| 6,283,625 | B2 | 9/2001 | Frankel et al. |
| 6,824,303 | B2 * | 11/2004 | Huang .................. 366/204 |
| 2002/0130137 | A1 | 9/2002 | Greenwald et al. |

FOREIGN PATENT DOCUMENTS

| | | |
|---|---|---|
| DE | 10223444 | 12/2003 |
| EP | 1133932 | 9/2001 |
| EP | 1529620 | 5/2005 |
| FR | 1430316 | 3/1966 |
| FR | 2839277 | 11/2003 |
| FR | 2887525 | 12/2006 |
| GB | 566834 | 1/1945 |
| RU | 1655972 | 12/2006 |
| WO | 02082922 | 10/2002 |
| WO | WO2005044540 | 5/2005 |
| WO | 2007120807 | 10/2007 |

OTHER PUBLICATIONS

DE1022344 abstract, Dec. 2003.

DE1022344 Translation, Dec. 2003.

* cited by examiner

METHOD OF PREPARING FOAM FROM A MILK-BASED ALIMENTARY LIQUID AND METHOD FOR IMPLEMENTING THE SAME

CROSS-REFERENCE TO RELATED APPLICATIONS

This application is a divisional of U.S. patent application Ser. No. 10/598,669, filed Jun. 19, 2007, which is the U.S. national stage designation of International Application No. PCT/EP05/002378 filed Mar. 7, 2005, which claims priority to EP 04005729.1 filed on Mar. 10, 2004, the entire contents of which are expressly incorporated herein by reference.

BACKGROUND

The present invention concerns a method of preparing foam or froth from a milk-based alimentary liquid, intended for example, to be used in the preparation of coffee-based drinks such as cappuccinos, milky coffee, café latte and macchiato, etc. The present invention also concerns a device for implementing said preparation method.

Currently, the most common method of preparing foam from a liquid such as milk is to pour the desired quantity of milk into a receptacle, to dip the steam outlet nozzle of a coffee machine into the receptacle while shaking it from top to bottom to draw in the air necessary to obtain foam.

A first drawback of this method is the need to have either a professional type coffee machine which is generally expensive, or a domestic coffee machine with a steam outlet nozzle which is generally inappropriate.

Another drawback lies in the fact that it is not generally possible to prepare the foam at the same time as the coffee, unless one has a complex and expensive coffee machine with fluid systems for producing hot water for the coffee and for producing steam that are independent of each other.

Another drawback linked to the use of coffee machines with a steam outlet nozzle arises from the fact that the water heating system in such machines, usually a heating-unit, has to remain permanently switched on in order to be kept at a high temperature and to be able to produce steam without requiring inconvenient waiting time. These coffee machines consequently consume significant quantities of energy, which makes the use thereof uneconomical. It should also be noted that depending upon the hardness of the water used, the steam flow nozzles quickly become coated with limescale so that the machines have to be regularly taken out of service in order to descale them.

Another drawback of this type of machine arises from the fact that the quality of the foam obtained depends upon the skill of the user such that the machines do not allow foam with homogenous consistence and quality to be obtained in a reproducible manner.

Household appliances for stirring alimentary liquid in order to generate foam using mechanical elements are already known. However, the operation mode of these devices is too general and not adapted for generating a smooth, fine and hot milk foam in a very short period of time in order to prepare a drink such as a cappuccino. The use of these devices is also not very practical or very hygienic. Indeed, the stirring elements need to removed to be cleaned which requires some handling by the user. The stirring elements can also dirty the rest of the device when it is dismantled particularly the heating element with all the drawbacks linked with cleaning burnt on food residue. All these drawbacks make them inconvenient to use for preparing foam based drinks.

SUMMARY

It is thus a main object of the invention to overcome the drawbacks of the aforementioned prior art by providing a method of preparing foam from a milk-based alimentary liquid that is simple, economical, and easy to use and that produces rapidly high quality foam in a reproducible manner.

It is also an object of the invention to provide a device for implementing such a method.

It is also an object of the invention to provide a device of this type which can easily and quickly used, that further requires minimum maintenance and that can be easily cleaned after use.

It is also an object of the invention to provide a device of this type for producing foam from a milk-based alimentary liquid that does not require the use of steam.

It is also an object of the invention to provide a device of this type the implementation of which for producing foam can easily be automated.

It is also an object of the invention to provide a device of this type independent of a conventional coffee machine.

The invention thus concerns a method of preparing foam from a milk-based alimentary liquid for preparing a drink such as a cappuccino with a device comprising a frame including a support for a container, said support being associated with heating means for heating said alimentary liquid contained in said container when the container is disposed on said support, mechanical stirring means extending at least partially into said container, means for driving said stirring means, and control and command means arranged for automatically controlling the command of said heating means and said drive means, said method comprising the successive steps of:

a) placing a quantity of alimentary liquid in the container associated with said stirring means;

b) commanding, via the control and command means said heating means associated with said support for heating said quantity of alimentary liquid and bring it in proximity to or at a predetermined temperature level while commanding said driving means for said mechanical stirring means at a first predetermined stirring speed, lower than the foam generating speed for stirring said quantity of alimentary liquid; and c) commanding, via the control and command means said mechanical stirring means for stirring said quantity of liquid at a second predetermined stirring speed, effective to make said liquid foam.

This method advantageously enables foam to be prepared quickly, i.e. within few seconds only, from a determined quantity of liquid using a mechanical stirring device of simple and economical construction that does not use steam; thereby removing the drawbacks associated with the production of steam. Since the device for implementing this method can be made separately from a coffee machine, it is possible to prepare the coffee and the foam simultaneously.

Preferably, the quantity of heating energy used during step b) is adapted as a function of said quantity of liquid to be made to foam, such adaptation of the quantity of heating energy can be achieved by adjusting the heating power and/or the heating time.

It will be noted that simultaneously stirring and heating the liquid at the speed lower than the foam generating speed, typically of the order of 500 to 1500 rpm, brings the entire volume of liquid to the optimum foam forming temperature more quickly. Of course, the foam generating speed can vary depending upon the propensity of the alimentary liquid to form foam, depending, in particular, upon its composition, such as its fat, emulsifier, water and/or protein content.

Since foam is a thermal insulator which could slow down the temperature increase of the liquid, it is thus important to ensure that foam does not form before the liquid has reached the optimum foam forming temperature, typically comprised between 60° C. and 70° C. in the case of milk.

Preferably, the second predetermined speed is at least twice, preferably three times higher than the first predetermined speed. The first predetermined speed range is chosen so that a forced convection mode is carried out in the liquid which promotes a more rapid rise of temperature in the liquid but is still low enough to not form foam which would act as a thermal insulator. The second predetermined speed range is selected so that the liquid which has substantially reached its temperature level can be changed rapidly into a foam.

According to a preferred embodiment of the invention, the liquid is kept at the determined temperature during the foam forming step in order to optimise formation of the foam and to be able to use "hot" foam thereafter.

Moreover, it will be noted that during the foam forming step, the stirring is advantageously carried out in a discontinuous manner in order to reduce the time for converting the liquid into foam. Such stirring is advantageously achieved using a rotating stirring member rotating at a high speed during step c), typically between 3000 and 10000 rpm. Indeed, it has been observed that at these speeds, the foam initially formed is quickly pushed via centrifugal force against the walls of the container, thus moving away from the stirring member, so that a significant part of the foam is no longer being stirred. In order to overcome this problem, the stirring is discontinuous in order to regularly interrupt the aforementioned centrifugal effect. These regular interruptions, which preferably have a frequency of the order of 0.3 to 0.5 Hz, thus enable the foam to descend again and come into contact with the rotating stirring member to be stirred again as soon as stirring begins again. It will be noted in this regard that the rotating stirring can start again in the same rotational direction or in the opposite direction. By way of indication, the foam forming step lasts around 5 to 15 seconds for a volume of liquid of 40 to 80 milliliters.

According to another aspect, the invention concerns a device for preparing foam from a milk-based alimentary liquid for preparing a drink such as a cappuccino, including a container for receiving said alimentary liquid, a frame including a support for said container, said support being associated with heating means for heating said alimentary liquid contained in said container when the container is disposed on said support, stirring means extending at least partially into said container, means for driving said stirring means, and control means arranged for controlling said heating means and said drive means, characterized in that said frame is connected to a mobile cover extending above said container, in that said drive means are disposed in said cover and in that said cover is mobile between a first position in which said drive means are coupled to said stirring means and a second position in which said drive means are uncoupled from said stirring means.

The principle of connecting the driving means to the stirring means as defined allows the device to be maintained more hygienically in particular by keeping the stirring means in the container after use which prevents the liquid or foam dripping onto the heating element and thus dirtying the latter or giving off undesirable burning odours. The stirring means can thus be cleaned more easily. Coupling is also quicker and the device is thus more convenient to use.

According to a preferred embodiment, the control means are arranged for heating a quantity of liquid for bringing it in proximity to a desired temperature level while stirring said quantity of liquid at a first speed during a first phase and for stirring said quantity of liquid at a second speed higher than said first speed during a second phase, and comprise selection means for adapting the quantity of heating energy provided during the first phase as a function of said quantity of liquid.

Thus, it is possible to automatically programme the duration of the first and second stirring periods and the passage from one period to another; in addition to the frequency of interruption and changes of direction. Such programming can occur by storing a programme using a microcontroller as a function of the capacity of the container. When the container is provided for one or two cups, it is quite easy to anticipate in advance the duration, rotation and frequency settings for the proper temperature and proper foaming of the liquid without having to use a temperature regulation. These production programmes or cycles can simply be switched on by actuating control keys associated respectively with predefined volumes of liquid to be foamed.

In addition to the heating time control, control of the stirring time at a first speed and control of the stirring time at a second speed, where rotating stirring means are used, the control means can advantageously control both the change of rotational direction of the latter and the frequency of such changes.

The container is advantageously removable and is associated with a cover carrying the stirring means. Those elements coming into contact with the alimentary liquid can thus be provided in dishwasher proof materials and are thus easy to clean. According to another embodiment of the invention, the device includes temperature detection means and the control and management means are arranged for controlling said driving means at least two speed levels as a function of the temperature level detected.

Other features and advantages of the invention will appear upon reading the description of an example embodiment, given by way of non-limiting illustration, with reference to the annexed drawings, in which:

Additional features and advantages are described herein, and will be apparent from the following Detailed Description and the figures.

DETAILED DESCRIPTION

Figure 1:
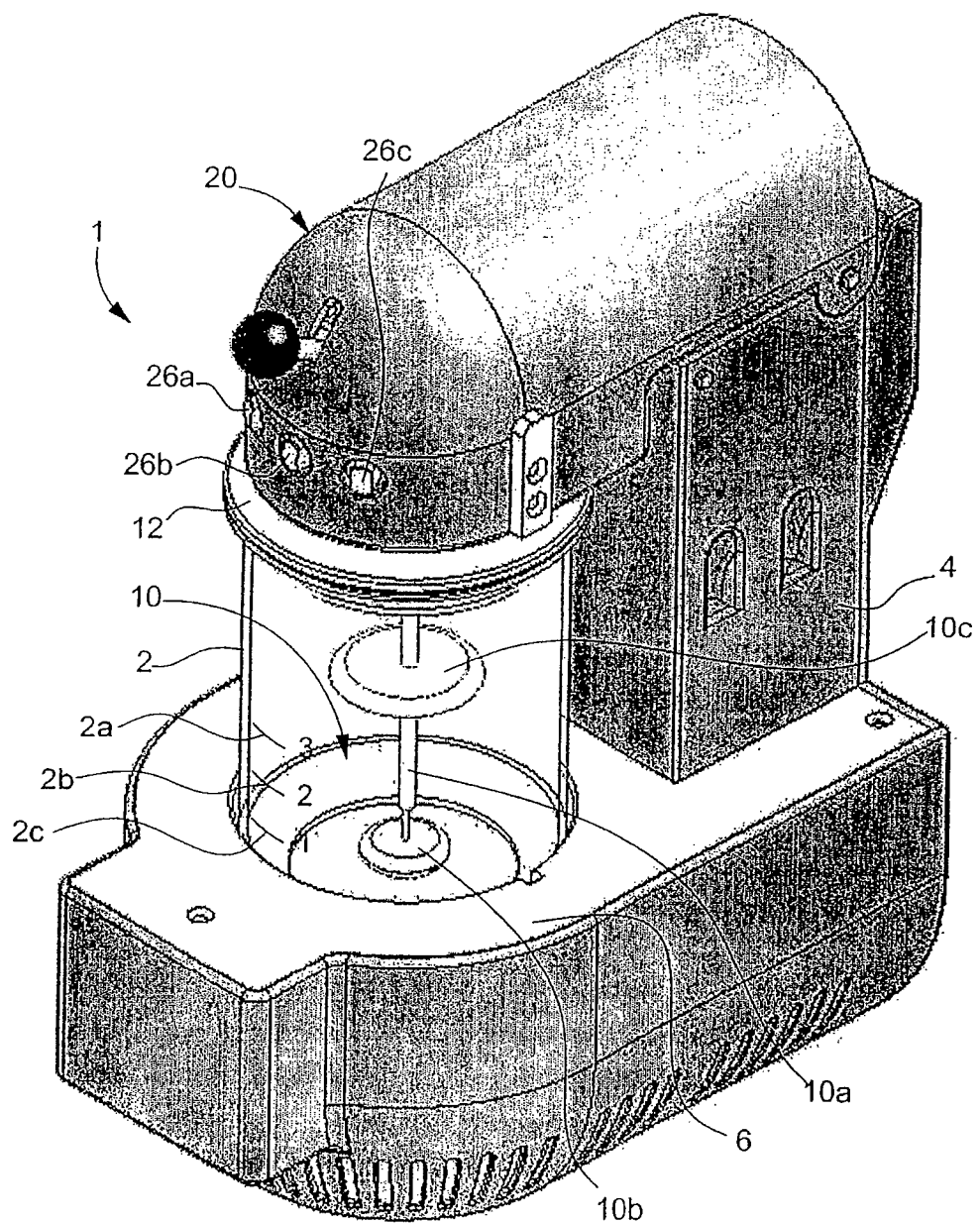
FIG. 1 is a general perspective view of a device for preparing foam in accordance with the invention.
Figure 2:
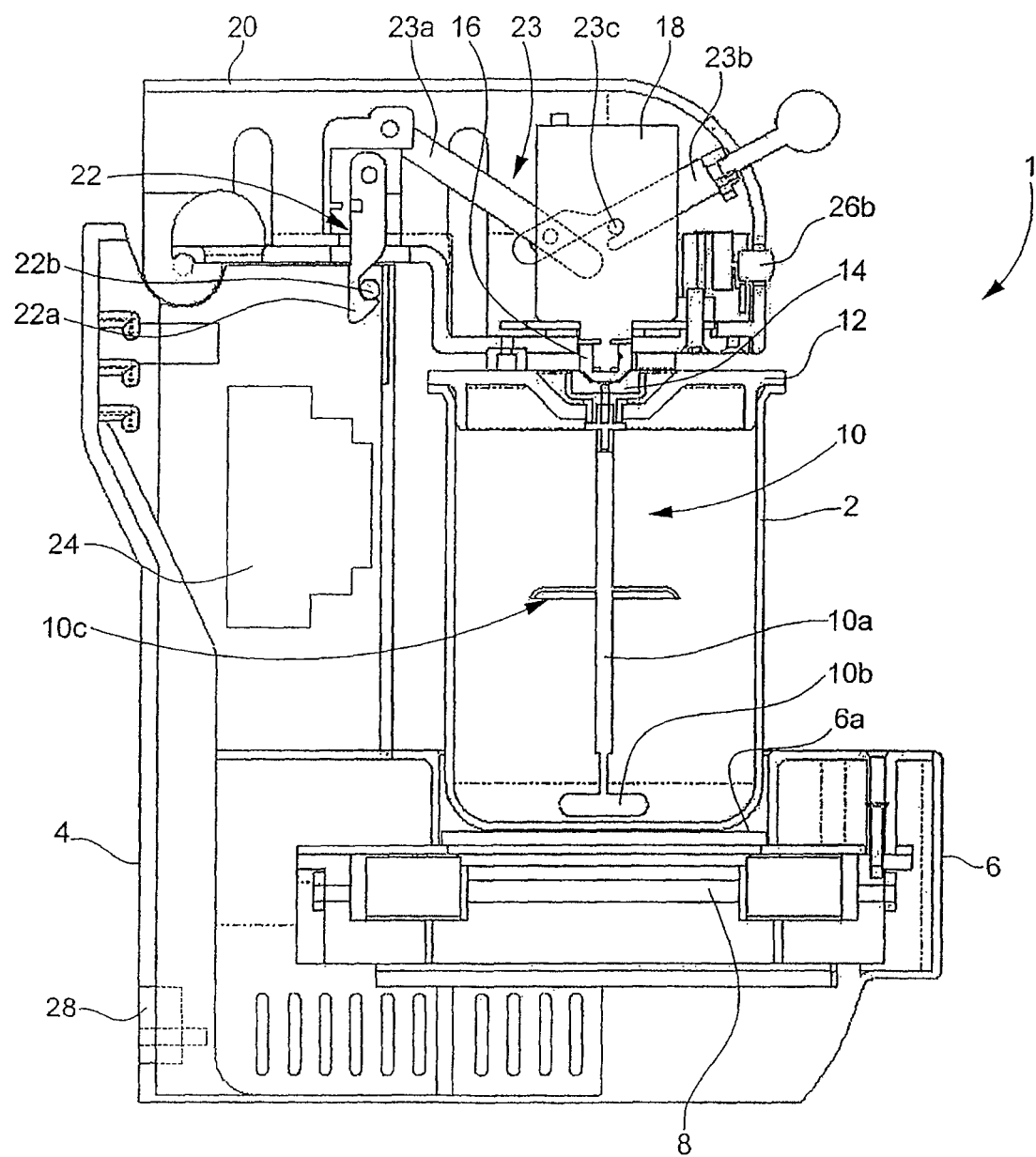
FIGS. 2 and 3 are cross-sectional views of the device for preparing foam in accordance with the invention shown respectively in the operating position and in the rest position.
Figure 3:
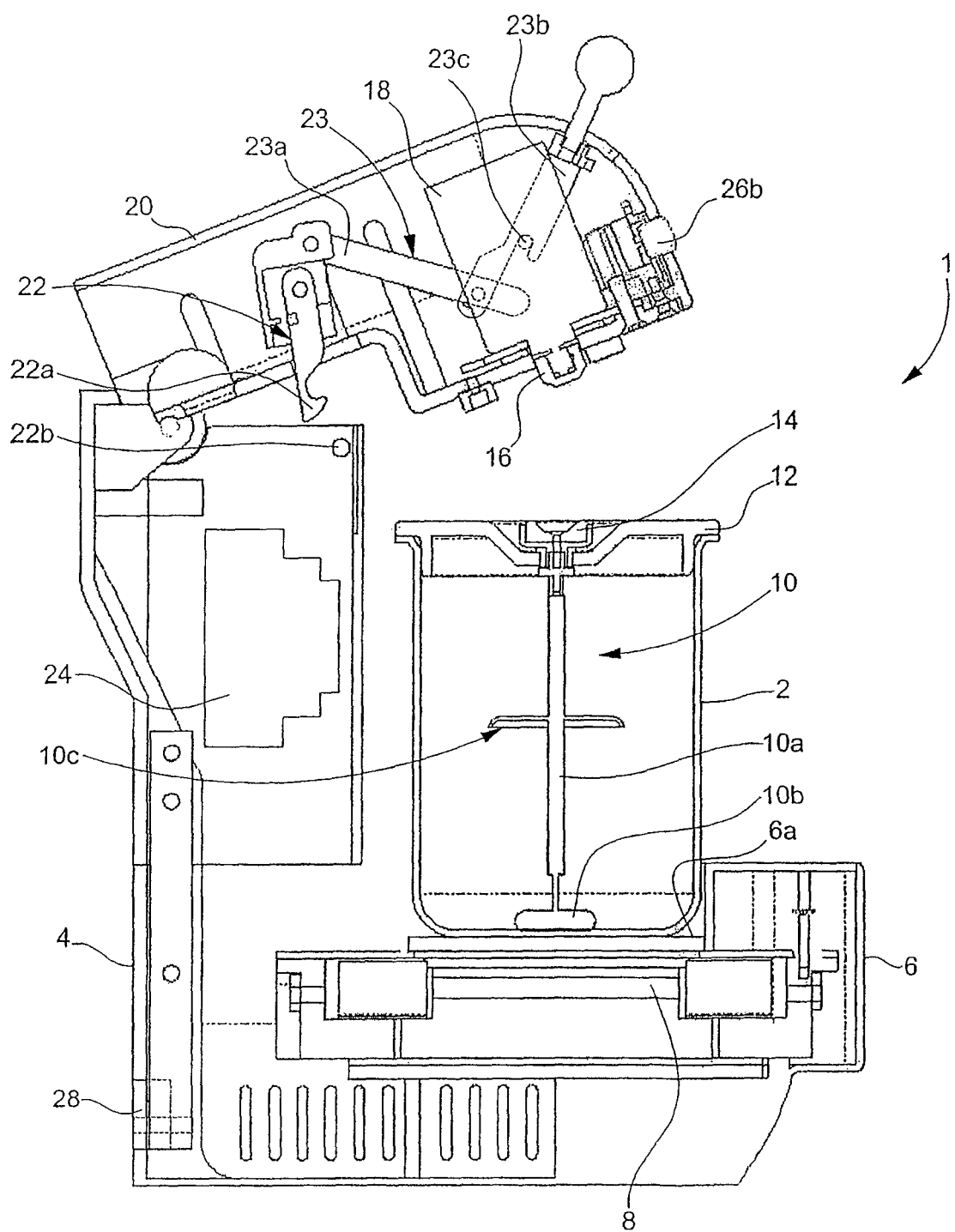

Referring to FIGS. 1 to 3, there is shown a device according to the invention for preparing foam from a milk-based alimentary liquid designated by the general reference numeral 1. Device 1 includes a container 2 for receiving an alimentary liquid, typically milk, from which the foam will be produced. In the example illustrated, container 2 has the form of a generally cylindrical pot with a slightly flared portion provided with a beak (not shown). Container 2 can be made of any material withstanding temperatures of the order of 200° C. for example Pyrex glass or similar. Other geometrical shapes can of course be envisaged for the container. It will be noted that in this example embodiment, container 2 includes three level markers 2a, 2b, and 2c for determining three filling levels of container 2. A handle (not shown) secured to the container, for example by a metal binding can be envisaged to facilitate handling thereof.

The device further includes a frame 4 provided with a support 6 having a surface 6a of substantially complementary dimensions and shapes to the bottom surface of container 2 for receiving and positioning the latter. For this purpose, the surface of support 6a is arranged to be slightly set back in relation to the upper surface of support 6. Container 2 is thus removably mounted on support 6 of frame 4. The surface 6a of support 6 is in a thermal relationship with an electrical heating element 8 for heating the alimentary liquid contained in container 2. Heating element 8 is, for example, formed of a resistant heating plate or a halogen lamp. In the latter case, it will be noted that the support surface 6a is formed of a vitroceramic plate underneath which the halogen lamp is arranged. It goes without saying that any other type of electrical heating body can be envisaged. The heating element has sufficient power to quickly heat a quantity of alimentary liquid from 40 ml to 80 ml to a temperature comprised between 60° and 85° C., for example with power comprised between 600 and 2300 W.

Device 1 further includes mechanical stirring means 10 which extend at least partially into container 2. Stirring means 10 are of the rotating type and comprise a rod 10a provided, at its distal end, with a stirring head 10b which extends in proximity to the bottom of container 2. Typically, stirring head 10b includes a ring-shaped helical spring. According to a variant that is not shown, the stirring head can include a plurality of radial and vertical wings. The Figures also show that in this example, rod 10a includes a collar 10c arranged at approximately mid-length. Collar 10c advantageously enables liquid dripping down from the stirring head to be recovered when the cover is removed from container 2 and rests flat on its upper surface.

In this example embodiment, it can be seen that container 2 is associated with a cover 12 which carries stirring means 10. More specifically, rod 10a is rotatably mounted via its proximal end in cover 12. The end of rod 10a passes through the cover to extend outside the container when the cover closes the latter. This end includes a female coupling part 14 for cooperating with a complementary male coupling part 16 connected to means 18 for driving stirring means 10. Advantageously, coupling with the driving means is achieved via friction for example of the cone on cone type.

Drive means 18 are typically made in the form of an electrical motor with two directions of rotation capable of rotating within ranges of speed from 500 to 10000 rpm. These drive means 18 are mounted in a mobile cover 20 connected to frame 4 and extending above container 2. Cover 20 is mounted so as to be mobile on frame 4 so that it can pivot between a first position (FIG. 2) in which drive means 18 are coupled to stirring means 10 and a second position (FIG. 3) in which said drive means are uncoupled from stirring means 10 and in which container 2 can be removed from device 1.

It will be noted in this regard that the cover is associated with locking means 22 provided for holding cover 20 respectively in the first and second positions. Locking means 22 have here the shape of an articulated hook 22a secured to cover 20 cooperating with a pin 22b secured to frame 4. Hook 22a can be actuated for locking and/or unlocking via a toggle mechanism 23, one lever 23a of which is connected to hook 22a and the other lever 23b of which is connected to a control member accessible from the outside of cover 4, lever 23b resting on pin 23c secured to the cover.

Device 2 further includes control means 24 disposed in frame 4 and arranged for managing the control of heating body 8 and drive means 18. More specifically, the control means are arranged for heating a quantity of liquid to bring it in proximity to a desired temperature level while stirring said quantity of liquid at a first speed during a first phase and for stirring said quantity of liquid at a second speed higher than the first speed during a second phase. Since the heating and stirring conditions of the alimentary liquid depend upon the quantity of alimentary liquid contained in container 2, control means 24 comprise a microcontroller connected to motor 18 and to the heating element, and suitably programmed for controlling one or more foam producing cycles as a function of the quantity of liquid to be foamed. Control of these cycles is started by actuating control keys 26a, 26b, 26c, each of the keys corresponding to control by the microprocessor of a foam production cycle for a determined quantity of liquid. In the example shown, the control keys are three in number and correspond respectively to switching on a foam producing cycle for the three levels of liquid defined by the level markings 2a, 2b and 2c of container 2. These control keys 26a, 26b, 26c therefore form selection means for adapting the quantity of heating energy supplied during the first phase of the foam producing cycle and the duration of the second phase, as a function of the quantity of liquid in container 2. The heating energy can easily be adapted either by adjusting the power and/or the heating time.

Typically, the two speed levels can be obtained by acting directly upon the electrical motor control by varying the frequency of the control signal sent by the microcontroller. According to a variant one could also envisage varying the speed mechanically by varying a gear ratio disposed between the motor output and the stirring means.

The electrical elements of device 1 are powered via a supply plug 28 secured to the frame and intended to be connected to the mains supply via a conventional supply lead.

The method according to the invention for preparing foam from a determined alimentary liquid, in this case milk, will now be described using device 1 according to the invention and illustrated in FIGS. 1 and 2.

First of all a quantity of milk, corresponding to one of the three levels marked by marking lines 2a, 2b and 2c, is poured into container 2. Container 2 is then closed by means of cover 12 carrying stirring means 10. Container 2 is then placed on support surface 6a, cover 20 of device 1 having previously been placed in the open position (FIG. 2). Cover 20 is then tipped (FIG. 1). This causes male coupling part 16 connected to the drive means to friction fit into female coupling part 14 secured to stirring means 10 and emerging from cover 12 of container 2. Once in this configuration, control key 26a, 26b or 26c, corresponding to the level of liquid contained in container 2, can be actuated. Such actuation switches on the foam preparing cycle corresponding to the level of liquid selected, this cycle being controlled by control means 24.

During a first phase of the preparation cycle, control means 24 respectively switch on heating element 8 and motor 18 to supply the quantity of calorific energy necessary to bring the quantity of liquid selected to a desired temperature level and to mechanically stir the quantity of liquid at a first stirring speed, lower than the foam creating speed. Typically, the desired temperature for facilitating formation of milk foam is of the order of 60 to 70° C. and the first stirring speed is comprised between 500 and 1500 rpm and is preferably of the order of 800 rpm. Stirring at a relatively low speed homogenises the temperature of the milk in the container preventing layers of different temperatures from forming and in particular, the lowest layer from burning and sticking to the bottom of the container, while activating the desired temperature increase.

As soon as the quantity of heat energy corresponding to the quantity of liquid selected has reached the desired value, the microcontroller adjusts the command of heating element 8 so as to keep the quantity of alimentary liquid at the desired temperature level and triggers entry into a second phase during which the foam will be produced. For this purpose, the microcontroller sends a signal to motor 18 to drive the latter at a second stirring speed suitable for forming foam. This speed is typically comprised between 3000 and 10000 rpm and preferably of the order of 5000 rpm. The duration of this second phase which is controlled by the microcontroller varies in accordance with the quantity of liquid selected. Typically, for a quantity of liquid from 40 to 80 ml, the duration of this second phase is of the order of 5 to 15 seconds, which enables a foam phase to be prepared of the order of 30% to 60% foam with respect to the liquid phase. Preferably, the microcontroller is programmed, during this second preparation phase, to drive stirring in a discontinuous manner, or in other words to regularly interrupt and restart stirring during this phase in order to optimise foam formation. Typically the interruption frequency is of the order of 0.3 to 0.5 Hz. Preferably, the microcontroller can be programmed such that stirring member 10 changes its direction of rotation after each interruption during this second phase. Once the second phase has finished, the microcontroller commands the automatic stopping of device 1. Then cover 20 has only to be unlocked, tipped into its opening position and container 2 containing the foam can be removed.

The invention is of course not limited to the embodiment described hereinbefore and it will be understood that various alterations and/or improvements evident to those skilled in the art could be made without departing from the scope of the invention defined by the annexed claims. In particular, in order to limit the centrifugation effect during stirring, stirring means 10 could also be moved from top to bottom and/or in a transverse plane to bring the foam back into contact with the stirring means. Second stirring means could also be used, which depending upon the geometry of the container, could be disposed at the same level as the first means or at different levels. It should also be noted that the heating could be interrupted during the second foam preparing phase. Likewise, passage from a first stirring speed to a second stirring speed in the method according to the invention can occur gradually without departing from the scope of the invention.

According to an alternative embodiment, the microcontroller can be associated with means for detecting the temperature (not shown) of the alimentary liquid in order to command motor means 18 in accordance with at least two speed levels as a function of the temperature level detected. The temperature detection means typically comprise a thermal switch associated with the heating element and which enables the latter to be switched on as soon as a predetermined desired temperature has been reached. In this case the temperature of the liquid is measured indirectly. One could also envisage arranging a temperature sensor in the container, for example secured to the stirring means in order to obtain a direct liquid temperature measurement. According to this variant, the temperature detection means regularly send signal representative of the temperature to the microcontroller during the first phase. As soon as the temperature has reached the desired value, the microcontroller commands the control of the heating element 8 so as to keep the alimentary liquid at the desired temperature and triggers entry into the second phase during which the foam will be produced, the microcontroller then sending a signal to motor 18 to drive the latter at a second stirring speed suitable for forming foam.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A device for preparing foam from a milk-based alimentary liquid for preparing a drink, the device comprising:
   a container for receiving the alimentary liquid,
   a frame including a support for the container, the support being associated with a heater for heating the alimentary liquid contained in the container when the container is disposed on the support,
   a stirrer extending at least partially into the container,
   drive means for driving the stirrer, and
   control means arranged for controlling the heater and the drive means, the control means arranged for heating a quantity of liquid to bring the quantity of liquid in proximity to a desired temperature level while stirring the quantity of liquid at a first speed during a first phase and for stirring the quantity of liquid at a second speed during a second phase, the control means comprising selection means for adapting the amount of heating energy supplied during the first phase as a function of the quantity of liquid, the frame being connected to a mobile cover extending above the container, wherein the drive means is disposed in the cover and the cover is mobile between a first position in which the drive means is coupled to the stirrer and a second position in which the drive means is uncoupled from the stirrer.

2. The device according to claim 1, wherein the second speed is higher than the first speed.

3. The device according to claim 1, wherein the control means is arranged for heating the quantity of liquid during the second phase.

4. The device according to claim 1, wherein the selection means includes a plurality of control keys, each of the keys corresponding to the supply of a quantity of energy for a determined quantity of liquid.

5. The device according to claim 1, wherein the container is removably mounted on the support.

6. The device according to claim 1, wherein the container is associated with a cover and the cover carries the stirring means.

7. The device according to claim 1, wherein the stirrer is formed by a rod including a stirring head at its distal end.

8. The device according to claim 7, wherein the rod is rotatably mounted in the cover.

9. The device according to claim 7, wherein the stirring head extends in proximity to the bottom of the container.

10. The device according to claim 1, wherein the drive means is coupled to the stirrer by a friction coupling.

11. The device according to claim 1, comprising locking means for holding the cover respectively in the first and second positions.

12. The device according to claim 1, wherein the control means is disposed in the frame and the control means is connected to control keys arranged on one surface of the cover.

13. The device according to claim 1, wherein the drive means further includes a motor with two directions of rotation.

14. A device for preparing foam from a milk-based alimentary liquid for preparing a drink, the device comprising:
- a container for receiving the alimentary liquid,
- a frame including a support for the container, the support being associated with a heater for heating the alimentary liquid contained in the container when the container is disposed on the support,
- a stirrer extending at least partially into the container,
- drive means for driving the stirrer, and
- control means arranged for controlling the heater and the drive means, wherein the control means includes temperature detection means and the control means is arranged for controlling the drive means in accordance with at least two speed levels as a function of the temperature level detected, and the frame is connected to a mobile cover extending above the container, wherein the drive means is disposed in the cover and the cover is mobile between a first position in which the drive means is coupled to the stirrer and a second position in which the drive means is uncoupled from the stirrer.

* * * * *